United States Patent [19]

McAninch et al.

[11] 3,815,442

[45] June 11, 1974

[54] DIFFERENTIAL MECHANISM

[75] Inventors: Herbert A. McAninch, Auburn; Spencer H. Mieras, Fort Wayne, both of Ind.

[73] Assignee: Borg Warner Corporation

[22] Filed: Oct. 27, 1958

[21] Appl. No.: 769,682

[52] U.S. Cl..................... 74/711, 74/710.5, 74/713
[51] Int. Cl............................ F16h 1/44, F16h 1/40
[58] Field of Search ..................74/710.5, 711, 713

[56] References Cited
UNITED STATES PATENTS

| | | | |
|---|---|---|---|
| 1,481,889 | 1/1924 | Carhart | 74/711 |
| 1,979,414 | 11/1934 | Smith | 74/711 |
| 2,234,591 | 3/1941 | Fitzner | 74/711 |
| 2,762,240 | 9/1956 | Eckert | 74/711 |
| 2,778,246 | 1/1957 | Thornton | 74/711 |
| 2,821,096 | 1/1958 | Lyeth, Jr. | 74/711 |
| 2,850,922 | 9/1958 | Welsh | 74/711 |
| 2,856,048 | 10/1958 | Carlson | 192/89 B |
| 2,858,920 | 11/1958 | Doble | 192/89 B |
| 2,930,256 | 3/1960 | Wildhaber | 74/711 |

FOREIGN PATENTS OR APPLICATIONS

| | | | |
|---|---|---|---|
| 446,143 | 3/1949 | Italy | 192/89 B |

*Primary Examiner*—Samuel Scott
*Assistant Examiner*—Lance W. Chandler
*Attorney, Agent, or Firm*—C. G. Stallings

EXEMPLARY CLAIM

1. In a differential mechanism the combination comprising a hollow casing adapted to be rotated, a plurality of pinion gears rotatably and revolably mounted in said casing, said casing having means defining a pair of openings, an output shaft received in each of said openings, a side gear affixed on the inner end of each of said shafts for limited axial movement with respect thereto, each of said gears being in mesh with said pinions and normally driven thereby at equal speed, at least one of said side gears and at least one of said pinion gears having positive pressure angle teeth, said gears being normally relatively fixed with respect to said pinions and being relatively movable with respect thereto to afford differentiation, said casing having a splined bore adjacent the inner end of each of said output shafts, each of said side gears being formed with an axially outwardly extending externally splined hub, a disc pack received in each of said bores and being operatively connected to the splines of each of said bores and the splines of each of said hubs, each of said disc packs being disposed radially outwardly of the area of mesh of said pinion gears and said side gears, and Belleville washer means extending between said casing and each of said disc packs for effecting a first axial thrust to urge said side gears into mesh with said pinion gears, said pinion gears and said side gears being additionally characterized as being meshed in a relationship such that when torque is applied to said hollow casing said pinion gears and said side gears provide a second axial thrust against said disc pack in a direction opposite the direction of said first axial thrust substantially uniform peripheral.

This invention relates to differential mechanisms and more particularly to a differential mechanism in which differentiation is retarded.

18 Claims, 8 Drawing Figures

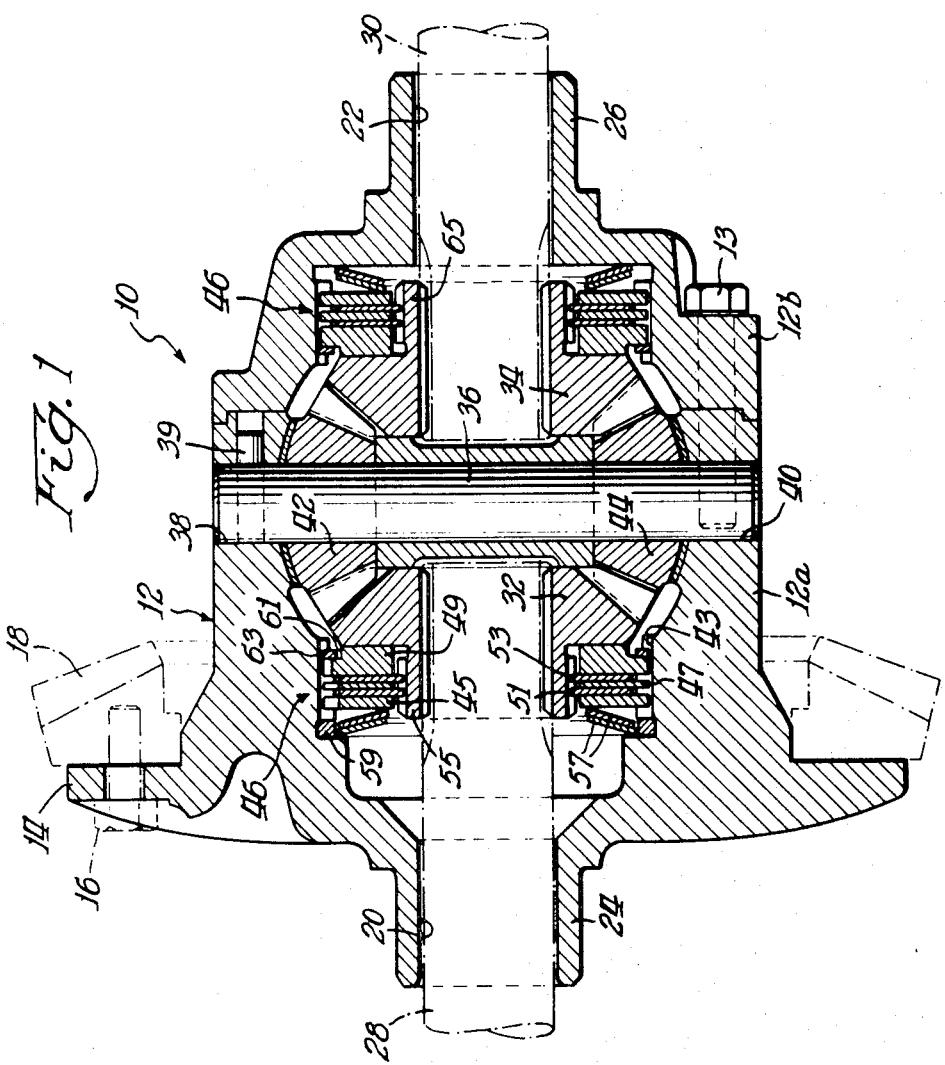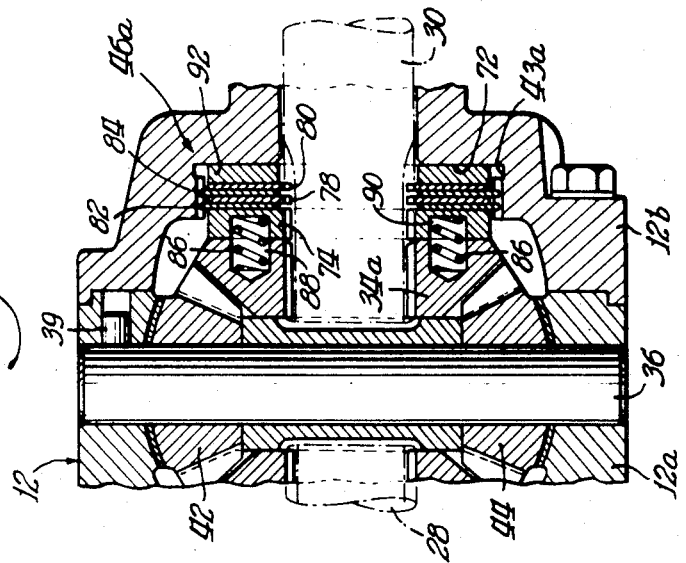

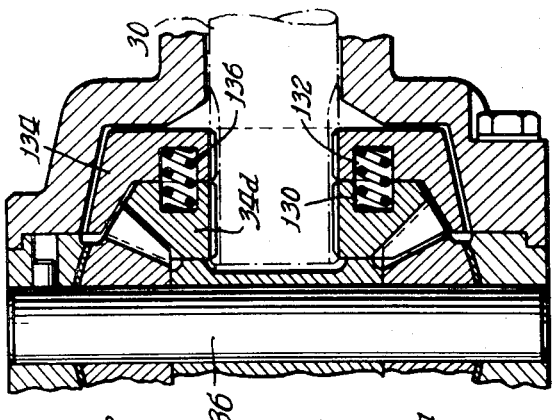
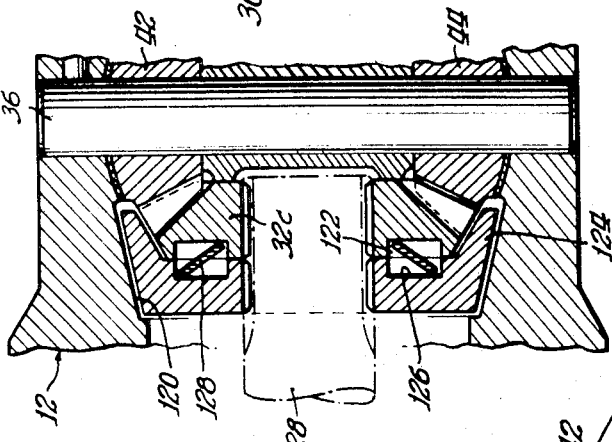
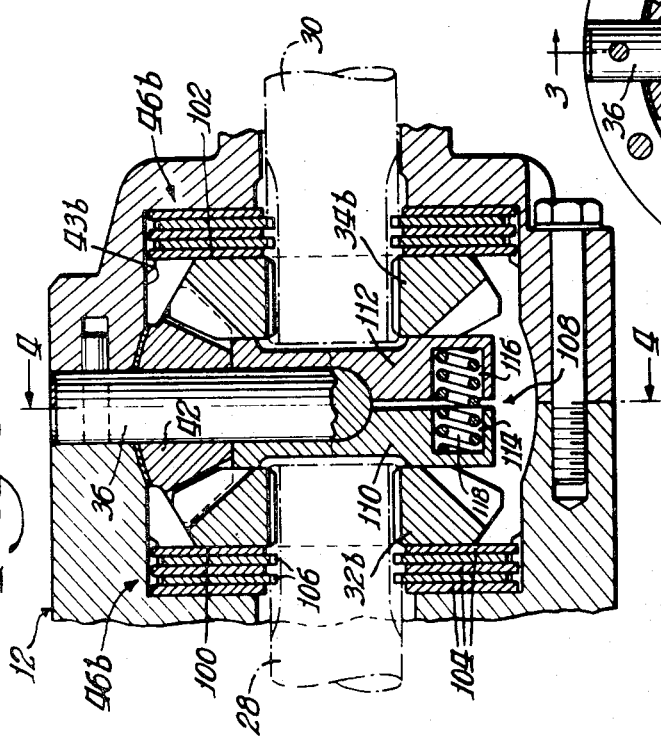
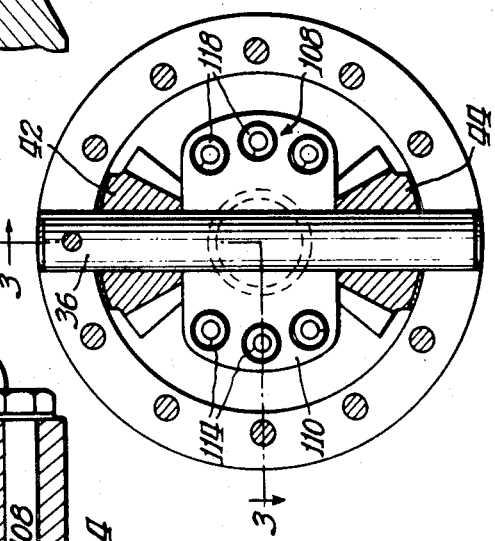

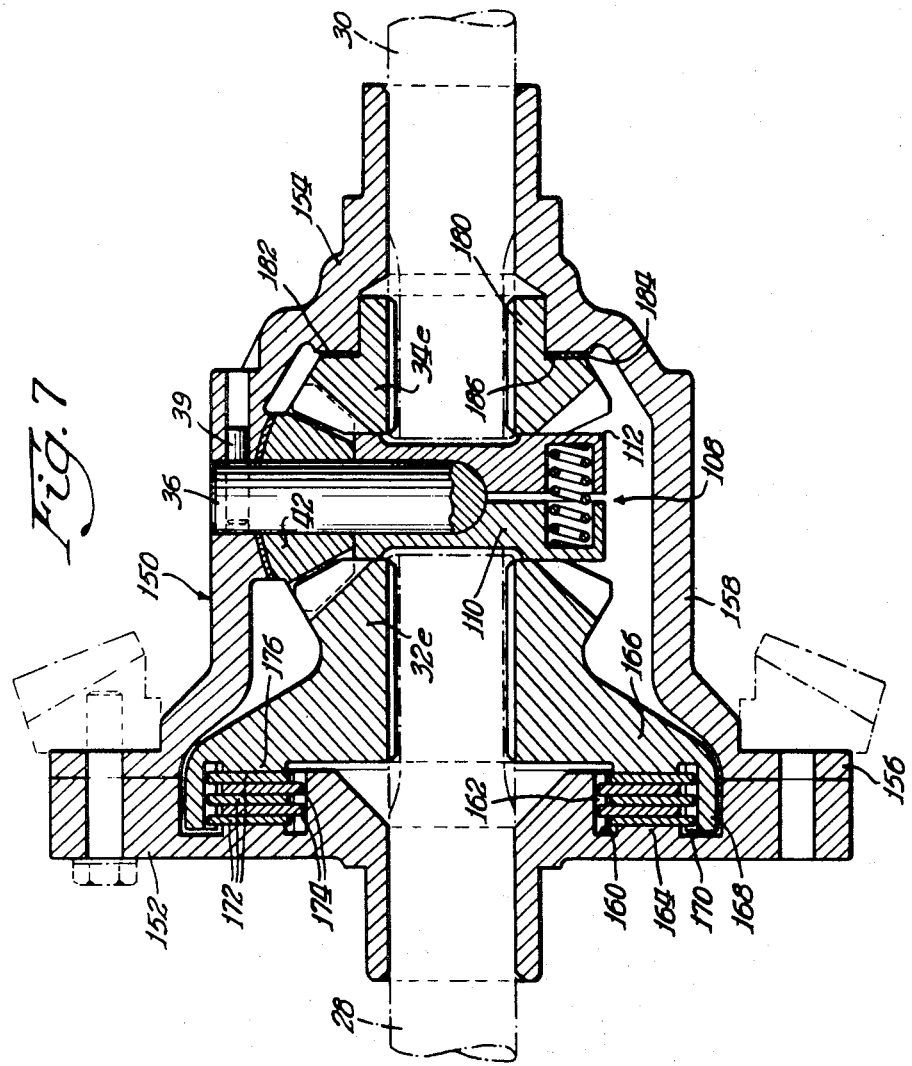
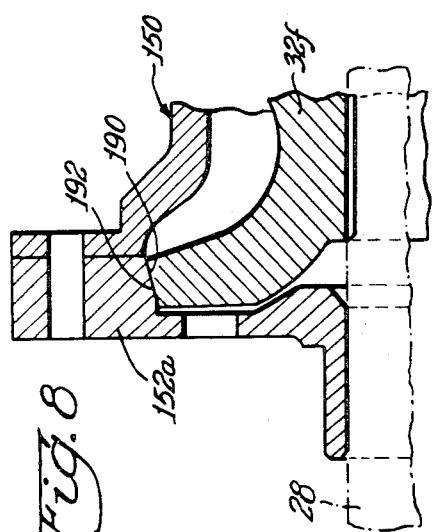

DIFFERENTIAL MECHANISM

This invention is primarily directed to a differential mechanism in which the resistance to differentiation is afforded by dual means including gear reaction and a spring preload.

A primary object of the invention is to provide a differential mechanism in which differentation is resisted by dual means including novel means for braking the differentiating element to the differential casing.

A more particular object of the invention is to provide a differential mechanism having a casing, output shaft mounted for rotation in the casing, side gears affixed to the inner ends of the output shafts, pinion gears in mesh with the side gears and normally adapted to revolve as the side gears rotate and adapted further to rotate with respect to the side gears when differentiation is required, a disc pack forming a brake for each of the side gears, each of the disc packs being actuated by spring means exerting a constant force biasing the side gears into frictional engagement with the casing and being actuated further by gear reaction proportional to the torque transmitted.

Another object of the invention is to provide a differential mechanism of the type described in which a constant biasing is exerted on a disc pack to afford a uniform resistance to differentiation and in which the constant biasing is exerted by spring means comprising a plurality of circumferentially spaced coil springs received in registering pockets in the side gears and an annulus in axial alignment with the discs of each pack.

A further object of the invention is to provide a differential mechanism of the type characterized by resistance to differentiation in which the differential casing is hollow in construction and is provided with a substantially frusto-conical surface spaced outwardly from the inner ends of the output shafts, in which a brake drum having a correspondingly formed periphery is mounted between each of the side gears and the casing, and in which an annular spring of the Belleville type is interposed between each of the side gears and its associated brake drum to exert a constant resistive bias.

Another object of the invention is to provide a differential mechanism of the type characterized by resistance to differentiation in which the differential casing is hollow in construction and is provided with a substantially frusto-concical surface spaced outwardly from the inner ends of the output shafts, in which a brake drum having a correspondingly formed periphery is mounted between each of the side gears and the casing, and in which the outer periphery of the brake drums are urged into frictional engagement with the frusto-conical surfaces of the casing by means of a plurality of circumferentially spaced coil springs received in registering pockets in the side gear and the adjacent brake drum.

An additional object of the invention is to provide a differential mechanism of the type above set forth in which one of the side gears is grounded to the differential casing at points spaced radially outwardly from the zone of mesh of the pinion gears and the side gears.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIG. 1 is a vertical elevational view of a differential mechanism made in accordance with the present invention;

FIG. 2 is a fragmentary vertical sectional view of the modified form of the invention;

FIG. 3 is a fragmentary elevational sectional view of a further modified form of the invention taken substantially on line 3—3 of FIG. 4;

FIG. 4 is an elevational view, partly in section, taken substantially on line 4—4 of FIG. 3;

FIG. 5 is a fragmentary elevational sectional view of a further modified form of the invention;

FIG. 6 is a fragmentary vertical sectional view of a still further modified form of the invention;

FIG. 7 is a vertical sectional view of another modified form of the present invention; and FIG. 8 is a fragmentary sectional view of still another modified form of the present invention.

Referring now to the drawings and more particularly to FIG. 1, the preferred form of differential mechanism of the present invention is indicated generally by reference numeral 10 and includes a differential casing 12 having an integrally formed radial flange 14 to which is secured by means of circumferentially spaced cap screws 16 a ring gear 18 (shown in dot-and-dash lines) connectible to the engine drive shaft in conventional fashion by a pinion gear (not shown). The casing 12 is shown as comprising complementary sections 12a and 12b secured each to the other by circumferentially spaced cap screws 13, is hollow in construction and is provided with diametrically opposed openings 20 and 22 defined by hubs 24 and 26 respectively. Journalled in the hubs 24 and 26 are output shafts 28 and 30 respectively. Splined to the inner ends of the shafts 28 and 30 for limited axial movement with respect thereto are side gears 32 and 34 respectively. A shaft 36 extends through the hollow interior of the casing 12 and is affixed at each end in diametrically opposed openings 38 and 40 by means of pins 39 (only one of which is shown). Rotatably mounted on the shaft 36 are pinion gears 42 and 44 each of which is in constant mesh with the side gears 32 and 34.

Power is normally transmitted from the engine drive shaft to the output shafts 28 and 30 by rotating the casing 12 and revolving the pinion gears 42 and 44 for rotation of the side gears 32 and 34 at equal speed. When differentiation is required relative movement occurs between the pinion gears 42 and 44 and one of the side gears 32 and 34 so that the pinion gears assume a new position with respect to that side gear and equal speed to the output shafts may be affected as before.

According to the present invention, relative movement of one of the gears 32 or 34 with respect to the pinion gears 42 and 44 is resisted under all conditions tending to effect differentiation. As will be hereafter apparent, this resistance to differentiation is effected by a dual means including a constant force operative under all torque conditions and a second force which varies according to the torque input at the time differentiation occurs. The casing section 12 a is provided adjacent the opening 20 with a splined bore 43. Slidably received in the bore 43 is a disc pack 46 including an annulus 45, of steel or the like, having a splined outer periphery received in the splines of the bore 43. Also slidably received in the bore 43 is an annular disc 47, of steel or the like, and a relatively thick annular retainer block 49, of sintered iron or the like. Both the discs 47 and the block 49 have splined outer peripheries received in the splines of the bore 43. Interleaved between the disc 47 and the elements 45 and 49 are annular discs 51 and 53, desirably of bronze or the like. The discs 51 and 53 are splined at their inner peripheries for sliding reception on an externally splined hub 55 integrally formed with the side gear 32. The elements 51 and 53 are normally held in frictional engagement with the elements 45, 47 and 49 by means of a pair of annular springs 57 of the Belleville type. While two annular springs are illustrated, it will be understood that one of such springs will suffice. The outer peripheries of the springs 57 abut against a snap ring 59 received in a suitable groove at the inner end of the bore 43, while the inner edges of the springs abut against one side of the annulus 45. By this arrangement, the discs 51 and 53 are maintained in frictional engagement with the elements 45, 47 and 49 and, in addition, the right side of the block 49, as viewed in FIG. 1, is urged into frictional engagement with the left side of the side gear 32. The block 49 has an annular recess 61 in which is received a snap ring 63 which resides in a correspondingly formed groove in the bore 43 to retain the elements 45, 47, 49, 51 and 53 in assembled relation.

It will be appreciated that the springs 57 exert a constant resistive bias on the side gear 32 and the output shaft 28 so that differentiation is retarded. Differentiation is also resisted by the tooth pressure of the pinion gears 42 and 44 against the side gears 32 and 34. Since the tooth pressure varies in accordance with the torque input to the differential unit, the resistance to differentiation increases in proportion to torque input and thus the total resistance to differentiation is cumulative.

The casing section 12b is provided with a disc pack 46 identical to that employed in the casing section 12a. In this instance, the side gear 34 is provided with an integral hub section 65 externally splined in the same manner as the hub 55 of the side gear 32. Each disc pack operates in the same fashion, as will be understood.

Referring now to FIG. 2, there is illustrated in this figure a modified form of the invention. Certain of the elements of this modified form of the invention are identical to that of the form of the invention of FIG. 1 and like references numerals are employed. The casing 12 has complementary sections 12a and 12b which are apertured for apertured shafts 28 and 30 respectively. Pinion gears 42 and 44 are mounted for rotation on a shaft 36 secured to the casing by pins 39. In this instance, however, a disc pack 46a is utilized in lieu of the disc pack 46 and a side gear 34a cooperates with the disc pack 46a in a novel manner which will now be described. The casing section 12b includes a bore 43a subjoining an annular flat surface 72. The disc pack 46a includes a relatively thick annulus 74 having a splined inner periphery receivable on the same splines of the shafts 30 as the side gear 34a. Also splined to the shaft 30 are discs 78 and 80, preferably of bronze or the like. Interleaved with the discs 78 and 80 are discs 82 and 84 having splined outer peripheries received in the splines of the bore 43a. The disc pack 46a is provided with a constant frictional bias by means of a plurality of circumferentially spaced coil springs 86 received in a corresponding numer of pockets 88 in one face of the side gear 34a and registering pockets 90 in the confronting face of the annular 74. It will be apparent that the annular 74 urges the several discs into engagement and biases the disc 80 against an annulus 92 which is in frictional engagement with the annular surface 72 of the casing section 12b. As in the principle form of the invention, a constant resistive bias is afforded by springs and a varying bias is afforded by the tooth pressure which varies with the torque input. It will be understood that the other side of the casing 12 is identical to the side illustrated.

Referring now to FIG. 3, there is illustrated in that figure a further modified form of the invention having certain elements identical to that of the form of the invention illustrated in FIG. 1 and identified by identical reference numerals. The casing 12, in this instance, has a bore 43b in which is positioned a disc pack 46b. The pinion gears 42 and 44 are the same as in FIGS. 1 and 2. In this instance, however, side gears 32b and 34b are splined to output shafts 28 and 30 respectively. The side gears 32b and 34b are respectively provided with flat annular outer surfaces 100 and 102 which abut against the associated disc packs 46b. Each of the disc packs 46b includes spaced discs 104 having splined outer peripheries received in the splines of the bore 43b and interleaved discs 106 whose inner peripheries are splined to the shafts 28 and 30 respectively.

The side gears 32b and 34b are biased uniformly outwardly by a spring assembly 108 which comprises housing sections 110 and 112 mounted in surrounding relation to the shaft 36 for limited relative movement each to the other. The section 110 is provided with a plurality of pockets 114 while the section 112 is provided with a similar number of registering pockets 116. In the registering pockets is received a spring 118. By this arrangement, the sections 110 and 112 are urged outwardly, thus urging the side gears 32b and 34b into engagement with the associated disc pack 46b.

In FIG. 5 is illustrated another modified form of the present invention in which like reference characters identify like parts. In this form of the invention a casing 12 is formed with a substantially frusto-conical surface 120 spaced radially outwardly from the zone of engagement of the pinion gears 42 and 44 with side gears 32c and 34c (not shown). The left side of the side gear 32c, as viewed in that figure, is provided with an annular groove 122. A brake drum 124 is splined to the shaft 28 and has a corresponding groove 126 in register with the groove 122. Positioned in the collaborating 122 and 126 is an annular spring 128 of the Belleville type. The spring 128 exerts a constant bias urging the brake drum 124 into engagement with the frusto-conical surface 120. As in the other forms of the invention this bias is supplemented by the force exerted by tooth pressure which, as pointed out previously, is proportional to the torque input.

In FIG. 6 is shown another modified form of the present invention similar to FIG. 5 but having, in lieu of the grooves 122 and 126 a side gear 34d having a plurality of circumferentially spaced pockets 130 in register with similarly formed pockets 132 in a brake drum 134. In each pair of registering pockets is a helical spring 136. The drum 134 has a substantially frusto-conical outer periphery which is urged into engagement with a correspondingly formed surface of the casing by the springs 136. It will thus be seen that the springs 136, in this form of the invention, exert the constant resistive bias.

This bias is supplemented by the variable torque bias, as in the other forms of the invention.

In FIG. 7 is illustrated another modified form of the invention having a differential casing 150 which comprises a first section 152 and an elongated second section 154 having at one end a radially outwardly extending flange 156 and an adjacent flared portion 158. The flange 156 is secured to the section 152 by suitable fastening means as in the other forms of the invention. The shaft 36 extends through the casing section 154 and carries pinion gears 42 and 44. Only the pinion gear 42 is illustrated since this view is similar to FIG. 3. The shaft 36 is retained in position by circumferentially spaced pins 39 as in the other forms of the invention. In this form of the invention, however, a side gear 32e is splined to the output shaft 28 and a side gear 34e is splined to the output shaft 30.

The casing section 152, in this instance, is provided with an annular groove 160 having splines 162 at its inner periphery and an annular flat ridge 164 at its base, for a purpose hereafter described. The side gear 32e has an radially extending section 166 having an axially extending flange 168 at its outer periphery. The flange 168 has internal splines 170. Receivable in the splines 170 are correspondingly splined annular clutch discs 172. Interleaved with the clutch discs 172 are similarly formed clutch discs 174 splined at their outer periphery to the splines 162 of the casing section 152. An annular ridge 176 is formed in the section 166 of the side gear 32e in register with the ridge 164 of the casing section 152. It will be noted that the side gear 34e has a reduced portion 180 defining a shoulder 182.

The side gears 32e and 34e are biased uniformly outwardly by the spring assembly 108, as in FIG. 3. As the side gear 32e moves outwardly, the discs 172 are urged into engagement with the discs 174 and differentiation is resisted.

Upon outward movement of the side gear 34e the shoulder 182 is urged into frictional engagement with an annular ring 184 of friction material which is in abutment with an annular surface 186 formed in the housing section 154 in the zone of mesh of the pinion gears and the side gears.

In FIG. 8 is shown a modified form of the invention illustrated in FIG. 7 in which casing section 152a is recessed and provided with a frusto-conical surface 190. A side gear 32f is flared outwardly at one end and has a frustoconical surface 192 which is urged into frictional engagement with the frusto-conical surface 190 by the spring assembly 108 and the gear reaction, as in the other forms of the invention. It will be noted that the surfaces 190 and 192 engage at points spaced radially outwardly from the zone of mesh of the pinion gears and side gears, as in the form of the invention shown in FIG. 7.

The differential mechanism of the above described invention exhibits important advantages over resistive differential mechanisms of the types heretofore known. For instance, the grounding of the side gears is effected in areas located either in the zone of mesh of the pinion or side gears, as in the forms of the invention shown in FIGS. 7 and 8 or in areas outside the zone of mesh. The constant resistive bias utilized in the present invention may take the form of any elastic member, it being understood that the spring arrangements are merely illustrative.

While we have described our invention in connection with certain specific constructions and arrangements, it is to be understood that this is by way of illustration and not by way of limitation and the scope of our invention is defined solely by the appended claims which should be construed as broadly as the prior art will permit.

We claim:

1. In a differential mechanism the combination comprising a hollow casing adapted to be rotated, a plurality of pinion gears rotatably and revolvably mounted in said casing, said casing having means defining a pair of openings, an output shaft received in each of said openings, a side gear affixed on the inner end of each of said shafts for limited axial movement with respect thereto, each of said gears being in mesh with said pinions and normally driven thereby at equal speed, at least one of said side gears and at least one of said pinion gears having positive pressure angle teeth, said gears being normally relatively fixed with respect to said pinions and being relatively movable with respect thereto to afford differentiation, said casing having a splined bore adjacent the inner end of each of said output shafts, each of said side gears being formed with an axially outwardly extending externally splined hub, a disc pack received in each of said bores and being operatively connected to the splines of each of said bores and the splines of each of said hubs, each of said disc packs being disposed radially outwardly of the area of mesh of said pinion gears and said side gears, and Belleville washer means extending between said casing and each of said disc packs for effecting a first axial thrust to urge said side gears into mesh with said pinion gears, said pinion gears and said side gears being additionally characterized as being meshed in a relationship such that when torque is applied to said hollow casing said pinion gears and said side gears provide a second axial thrust against said disc pack in a direction opposite the direction of said first axial thrust substantially uniform peripheral.

2. In a differential transmission unit, the combination comprising a casing, differential side gears mounted in the casing, compensating pinion gears between the side gears, the side gears being shiftable axially during relative rotation of the side gears and pinion gears, said side gears being provided with integral hubs having external gear teeth thereon, internal gear teeth on said casing concentric with said hub gear teeth, interleaved plates between each of said differential side gears and the opposing face of the casing, one set of plates having peripheral gear teeth interlocked with said casing gear teeth and the other set having internal gear teeth interlocked with the hub gear teeth, and a spring washer disposed about said hub and engaging said casing, said spring washer providing a substantially uniform peripheral axial force to bias said interleaved plates against said differential side gears thereby providing a retarding effect on the compensating action of the differential, said differential side gears moving axially outwardly upon increasing torque input to the differential to compress the interleaved plates against the opposed faces of the casing thereby increasing the retarding effect.

3. In a differential transmission unit, the combination comprising a rotatable gear case, a power transmission gear train operatively positioned within said case, clutch means operatively disposed between said gear train and said gear case for opposing relative rotary movement of the members of said gear train, a resilient washer engaging said clutch means and imparting a substantially uniform peripheral initial biasing effect thereto, at least some of the gears of said gear train having positive pressure angle teeth and at least one of the said gears having positive pressure angle teeth being movable in an outward direction, whereby upon the transfer of torque by said gear train the movable gear is urged outwardly to further engage said clutch means thereby resulting in greater opposition to the relative rotary movement of members of said gear train.

4. In a differential transmission unit the combination comprising, a rotatable gear case, a power transmission gear train operatively positioned within said case, said gear train including a pair of oppositely disposed differential gears adapted for receiving axle shafts, axially shiftable clutch plates positioned in said case, some of which are rotatable with said gear case and others which are rotatable with said differential gears, and a spring washer in said case acting to shift said plate axially relative to said case for providing a substantially uniform peripheral force to bias said clutch plates into engagement, at least some of said gears of said gear train having positive pressure angle teeth and at least one of said differential gears being axially shiftable, whereby upon the transmission of torque by said gear train, said axially shiftable differential gear is urged axially outward in proportion to the input torque, thereby further biasing said clutch plates into engagement.

5. In a differential transmission unit, the combination comprising a rotatable gear case, a power transmission gear train operatively positioned within said case, said gear train including a spider, a plurality of pinion gears rotatably mounted on the legs of said spider, a pair of oppositely disposed differential gears meshing with said pinion gears, at least one of said differential gears being axially shiftable, a plurality of interleaved friction plates disposed between said shiftable differential gear and the opposed surface of said gear case for opposing relative rotary movement of members of said gear train, some of said plurality of interleaved friction plates being rotatable with and axially movable relative to said case and the remainder of said plurality of interleaved friction plates being rotatable with and axially movable relative to said shiftable differential gear, and resilient means compressed between the interleaved friction plates and the opposed surface of said case for providing a substantially uniform peripheral axial force to bias said interleaved plates against said shiftable differential gear, thereby providing a retarding effect on the compensating action of the differential, at least some of the members of said gear train having positive pressure angled teeth, whereby said shiftable differential gear is shifted axially outwardly in response to input torque and further compresses said interleaved friction plates.

6. In a differential transmission unit the combination comprising
   a. a gear case,
   b. a power transmission gear train operatively positioned within said case and driven thereby and including a pair of gears,
   c. clutch means operatively connected to said power transmission gear train and said case for opposing relative rotative movement of said gears of said gear train,
   e. and resilient means independent of said gear train and operatively connected to said clutch means for loading said clutch means,
   f. the gears of said gear train being meshed in a relationship to provide a component of tooth pressure for urging at least one gear of said gear train axially outward to increase the loading of said clutch means in proportion to input torque to the transmission.

7. In a differential transmission unit the combination comprising
   a. a gear case,
   b. a power transmission gear train operatively positioned within said case
      1. and including at least a side gear,
   c. clutch means operatively connected to said gear train for opposing rotative movement of said side gear relative to another gear of said gear train,
   d. and resilient means operatively connected to said clutch means and independent of said side gear for loading said clutch means,
   e. the gears of said gear train being meshed in a relationship to provide a component of tooth pressure for urging at least said side gear axially outward to increase the loading of said clutch means in proportion to input torque to the transmission.

8. In a differential transmission unit the combination comprising
   a. a gear case,
   b. a power transmission gear train drivenly positioned within said case
      1. and including at least a pair of side gears
   c. a clutch means operatively connected to said gear train and said case and
      1. including a pressure plate for opposing relative rotative movement of said gears of said gear train,
      2. said pressure plate being mounted for axial movement relative to and unitary rotative movement with said gear case,
   d. and resilient means operatively connected to said clutch means and independent of said side gear for loading said pressure plate of said clutch means,
   e. the gears of said gear train being meshed in a relationship to provide a component of tooth pressure for urging at least one of said side gears axially outward to increase the loading of said clutch means in proportion to input torque to the transmission.

9. In a differential transmission unit the combination comprising
   a. a gear case,
   b. a power transmission gear train drivenly positioned within said case
      1. and including a pair of side gears,
   c. clutch means operatively connecting and opposing relative rotative movement of said side gears,
   e. and resilient means operatively connected to said clutch means and independent of said side gears for loading said clutch means,
   f. the gears of said gear train being meshed in relationship to provide a component of tooth pressure for urging at least said side gear axially outward to increase the loading of said clutch means in proportion to input torque.

10. In a differential transmission the combination comprising a. a gear case,
b. a power transmission gear train operatively positioned within said case,
  1. including a pair of side gears and compensating gearing,
c. clutch means operatively connected to said gear train and said case for opposing relative rotative movement of members of said gear train,
d. a first means including a first pressure plate and being independent of said side gear and operatively connected to said clutch means for operatively engaging the same,
e. and a second means including a second pressure plate means and being operatively connected to said clutch means for operatively engaging the same separately from the operative engagement of said first pressure plate with said clutch means whereby a double engagement is provided on said clutch means.

11. In a differential transmission unit the combination comprising
a. a gear case,
b. a power transmission gear train drivenly positioned within said case and
  1. including a pair of side gears and compensating gearing,
c. clutch means positioned between at least one of said side gears and said case for opposing relative rotative movement of members of said gear train,
d. first means operatively connected to said clutch means including a first pressure plate rotatable with and axially movable relative to said gear case and being independent of said side gear for engaging said clutch means,
e. and second means operatively connected to said clutch means including a second pressure plate means for engaging said clutch means separately from the engagement of said first pressure plate with said clutch means whereby a double engagement is provided on said clutch means.

12. In a differential transmission unit the combination comprising
a. a gear case,
b. a power transmission gear train drivenly positioned within said case
  1. and including a pair of side gears and compensating gearing,
c. clutch means operatively connected to said gear train and said case for opposing relative rotative movement of gears of said gear train,
d. and resilient means operatively connected to said clutch means independent of at least one of said side gears for engaging said clutch means,
e. the gears of said gear train being meshed in a relationship to provide a component of tooth pressure for urging at least one gear of said gear train to engage said clutch means separately from the engagement of the resilient means with said clutch means whereby a double engagement is provided on said clutch means.

13. In a differential transmission unit the combination comprising
a. a gear case,
b. a power transmission gear train drivenly positioned within said case
  1. and including a pair of side gears and compensating gearing,
c. clutch means operatively connected to and disposed between at least one of said side gears and said case for opposing relative rotative movement of members of said gear train,
d. a pressure plate mounted for unitary rotary movement with and axial movement relative to said gear case and adapted to cause engagement of said clutch means,
e. and resilient means independent of said side gear and engaging said pressure plate to apply a load on said clutch means,
f. the gears of said gear train being meshed in a relationship to provide a component of tooth pressure for urging said one side gear outwardly to engage said clutch means separately from the engagement of said pressure plate with said clutch means whereby a double engagement is provided on said clutch means.

14. In a drive transmission comprising driving and driven, relatively rotatable, coaxial members, a clutch mechanism adapted to drivingly connect said members comprising a first radially extending friction plate operatively connected to one of said members for rotation therewith, a second radially extending friction plate drivingly connected to the other of said members and arranged adjacent to said first friction plate, a pressure plate having a radially extending annular friction surface which is adjacent to one of said friction plates and engageable with a radially extending annular friction face formed on said one of said friction plates, said friction surface and said friction face being rotatable with respect to each other and at times urged against each other so as to define an area of frictional contact therebetween, means responsive to the torque input of said transmission for driving said friction surface and friction face towards each other with a force in accordance with the magnitude of said torque input so as to create a sliding frictional force over the entire area of said area of frictional contact, and additional means continually resiliently biasing said friction surface and friction face towards each other so as to apply a substantially constant force thereagainst in order to independently produce a second sliding frictional force against said entire area of said area of frictional contact, said additional means comprising a plurality of compression springs biasing said pressure plate into engagement with said one of said friction plates, said means responsive to the torque input of said transmission and said compression springs applying in parallel relationship to each other forces against said pressure plate in order to develop a cumulative sliding frictional force applied by said pressure plate against said entire area of said area of frictional contact.

15. A differential transmission unit comprising in combination, a rotatable gear case, a power transmission gear train operatively positioned within said case, clutch means operatively disposed between said gear train and said gear case for opposing relative rotation of the members of said gear train, said clutch means including a pair of friction surfaces at least one of which is associated with said gear train for rotation therewith and another of which is associated with said gear case for rotation therewith, and resilient means engaging said case and said clutch means with the bias thereof being independent of said gear train for causing engagement of said friction surfaces, the gears of said gear train being meshed in a relationship to provide a component of tooth pressure for urging at least one gear of said gear train axially outward to increase the force applied to said friction surfaces in proportion to the input torque to the transmission.

16. In a differential transmission unit the combination comprising a rotatable gear case having opposed inner end faces, a power transmission gear train operatively positioned within said case and including a pair of compensating gears and a pair of side gears intermeshed therewith, a pair of abutment means carried by said case inward from said inner end faces thereof, clutch means operatively disposed between each of said abutment means and said inner end faces of said gear case for opposing relative rotative movement of the members of said gear train, said clutch means including a plurality of interleaved friction plates some of which are secured to said side gears for rotation therewith and others of which are secured to said gear case for rotation therewith, and spring means engaging said inner end faces of said case and said clutch means with the bias thereof being independent of said gear train and biasing said interleaved friction plates axially inwards against said abutment means, the pitch line of said side and compensating gears being disposed at an angle to utilize the axial thrust of the meshing teeth of said gears to urge said side gears axially outward to supplement said spring means and increase the force to said friction plates in proportion to the torque input to the transmission.

17. In a differential transmission unit the combination comprising a rotatable gear case, a power transmission gear train operatively positioned within said case and including a pair of compensating gears and a pair of side gears intermeshed therewith, said side gears having a back face and said gear case having an inner end face means disposed in cooperating relationship with the back face of said side gear, circumferentially disposed abutment means carried by said case and positioned between said inner end face means and the plane of the back face of at least one of said side gears, a plurality of friction plates disposed between said abutment means and said inner end face means, some of said friction plates being operatively connected to said case for unitary rotation and axial movement relative thereto and the other of said friction plates being operatively connected to said one side gear for unitary rotation therewith and axial movement relative thereto, a spring washer reacting against one of said means and biasing at least some of said friction plates against the other of said means, said abutment means having an axial opening therethrough and at least a portion of said one side gear being movable axially outwardly through said opening, at least a portion of the back face of said side gear being operable to induce a biasing force on said friction plates, upon axial outward movement of said one side gear, the pitch line of said side and compensating gears being disposed at an angle to utilize the axial thrust of the meshing teeth of said gears to urge said one side gear outwardly to supplement said spring washer and increase the force to said friction plates in proportion to the torque input to the transmission.

18. In a differential transmission unit, the combination comprising a rotatable gear case, a power transmission gear train operatively positioned within said case, clutch means operatively disposed between said gear train and said gear case for opposing relative rotary movement of the members of said gear train, a resilient spring means engaging said clutch means and imparting a substantially uniform peripheral initial biasing effect thereto, at least some of the gears of said gear train having positive pressure angle teeth and at least one of the said gears having positive pressure angle teeth being movable in an outward direction, whereby upon the transfer of torque by said gear train the movable gear is urged outwardly to further engage said clutch means thereby resulting in greater opposition to the relative rotary movement of members of said gear train, said resilient spring means urging the gears of said gear train toward meshing relation.

* * * * *